US008139548B2

(12) United States Patent
Park et al.

(10) Patent No.: US 8,139,548 B2
(45) Date of Patent: Mar. 20, 2012

(54) METHOD AND APPARATUS FOR REMOVING INTERFERENCE FROM UPLINK SIGNAL IN TIME DIVISION DUPLEX (TDD) SYSTEM

(75) Inventors: Chi-Hyun Park, Suwon-si (KR); Young-Hoon Kwon, Seongnam-si (KR); Sang-Boh Yun, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1194 days.

(21) Appl. No.: 11/851,448

(22) Filed: Sep. 7, 2007

(65) Prior Publication Data

US 2008/0064432 A1    Mar. 13, 2008

(30) Foreign Application Priority Data

Sep. 7, 2006 (KR) .................. 10-2006-0086088

(51) Int. Cl.
*H04J 3/00*    (2006.01)
(52) U.S. Cl. ........ 370/336; 370/458; 370/321; 370/286; 370/294
(58) Field of Classification Search .................. 370/336, 370/422, 478, 498, 294, 286, 321, 458
See application file for complete search history.

(56) References Cited

U.S. PATENT DOCUMENTS

| 6,466,557 | B1* | 10/2002 | Doi ............................. 370/332 |
| 6,697,640 | B1* | 2/2004 | Katz et al. .................... 455/561 |
| 6,957,070 | B2* | 10/2005 | Voyer ............................. 455/450 |
| 7,450,905 | B2* | 11/2008 | Pan .............................. 455/63.1 |
| 7,555,300 | B2* | 6/2009 | Scheinert et al. ............. 455/450 |
| 7,583,935 | B2* | 9/2009 | Singh et al. .................... 455/73 |
| 2002/0015393 | A1* | 2/2002 | Pan et al. ...................... 370/335 |
| 2004/0002334 | A1* | 1/2004 | Lee et al. ...................... 455/436 |
| 2005/0141466 | A1* | 6/2005 | Krupka ......................... 370/338 |
| 2008/0248768 | A1* | 10/2008 | Doi et al. .................... 455/127.5 |

FOREIGN PATENT DOCUMENTS

KR    10-2005-0059206 A    6/2005

* cited by examiner

*Primary Examiner* — Ricky Q. Ngo
*Assistant Examiner* — Dewanda Samuel
(74) *Attorney, Agent, or Firm* — Jefferson IP Law, LLP (57) ABSTRACT

A method and apparatus for removing interference from a UpLink (UL) signal in a Time Division Duplex (TDD) system are provided. The method includes determining whether a section for receiving an UpLink (UL) signal from the MS overlaps with sections for sending a DownLink (DL) signal of neighbor BSs in service, the neighbor BSs sending the DL signal to another MS, when the UL signal section overlaps with the DL sections of the neighbor BSs, detecting DL transmit signal information from the neighbor BSs transmitting in the overlapping sections, and removing interference from the UL signal using the detected transmit signal information. Accordingly, the accuracy of detecting the signal from the MS can be raised without having to adopt the complex resource allocation scheme to avoid the interference of the neighbor BSs.

21 Claims, 6 Drawing Sheets

METHOD AND APPARATUS FOR REMOVING INTERFERENCE FROM UPLINK SIGNAL IN TIME DIVISION DUPLEX (TDD) SYSTEM

PRIORITY

This application claims the benefit under 35 U.S.C. §119 (a) of a Korean patent application filed in the Korean Intellectual Property Office on Sep. 7, 2006 and assigned Serial No. 2006-86088, the entire disclosure of which is hereby incorporated by reference.

BACKGROUND OF THE INVENTION

1. Field of the Invention

The present invention relates generally to a method and apparatus for removing interference from an UpLink (UL) receive signal in a time division duplex system. More particularly, the present invention relates to a method and apparatus for removing a DownLink (DL) signal of an adjacent Base Station (BS) which causes interference to a UL signal of a BS in a Cross Time Slot (CTS) of a flexible time division duplex system.

2. Description of the Related Art

Figure 1A:
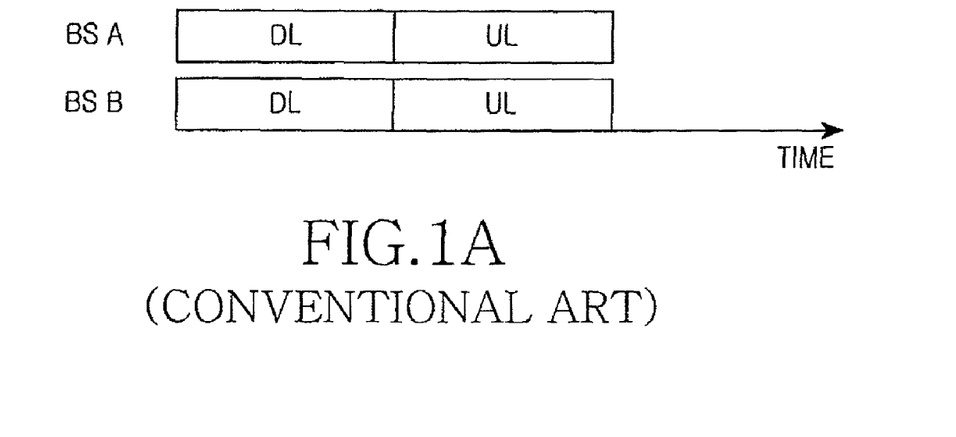
FIGS. 1A and 1B illustrate frame structures in a conventional TDD system.
Figure 1B:
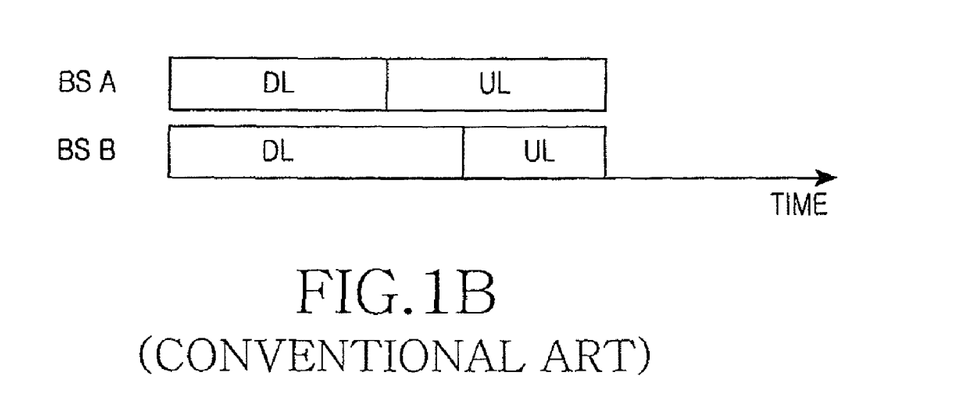

Typically, a Time Division Duplex (TDD) system time-divides the same frequency resource to transmit and receive data. A conventional TDD system has a fixed ratio of DownLink (DL) and UpLink (UL) of a Base Station (BS) as shown in FIG. 1A. Recently, as the traffic distribution varies according to a type of the wireless data service, a flexible TDD system is being developed to regulate the ratio of the DL and the UL according to the traffic distribution as shown in FIG. 1B.

Figure 2A:
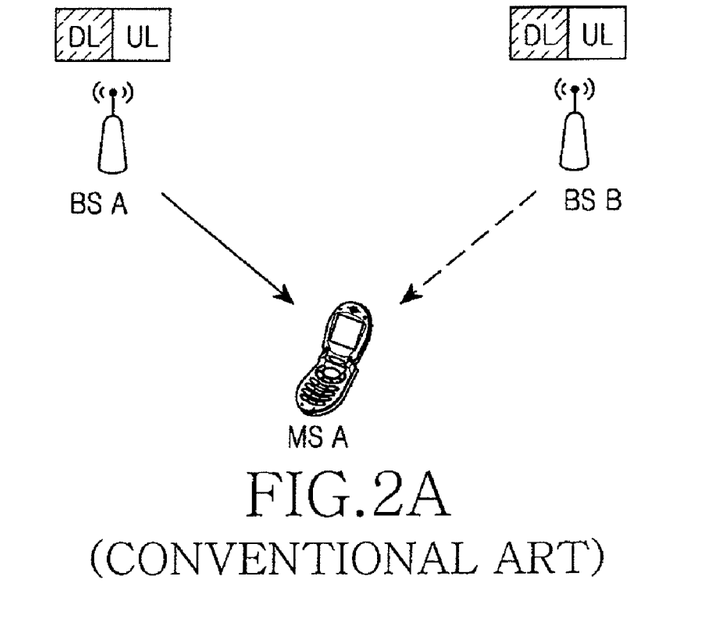
FIGS. 2A and 2B illustrate interference in UL and DL sections in a conventional fixed TDD system.
Figure 2B:
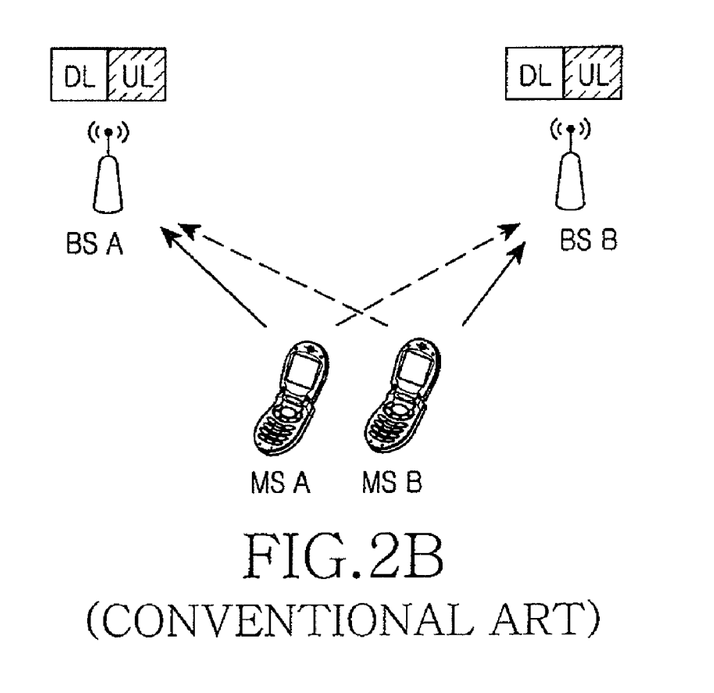

In a conventional TDD system with a fixed UL/DL ratio, interference is caused by a DL signal of a neighbor BS using the same frequency resource in a DL section where a BS sends a signal to a Mobile Station (MS) as shown in FIG. 2A. In a UL section where the MS sends a signal to the BS, interference is caused by a UL signal of an MS belonging to the neighbor BS using the same frequency resource as shown in FIG. 2B.

In addition to the interference in the UL and DL sections in the flexible TDD system, interference is caused in a Cross Time Slot (CTS) having the different UL/DL ratio between neighbor cells.

Figure 3:
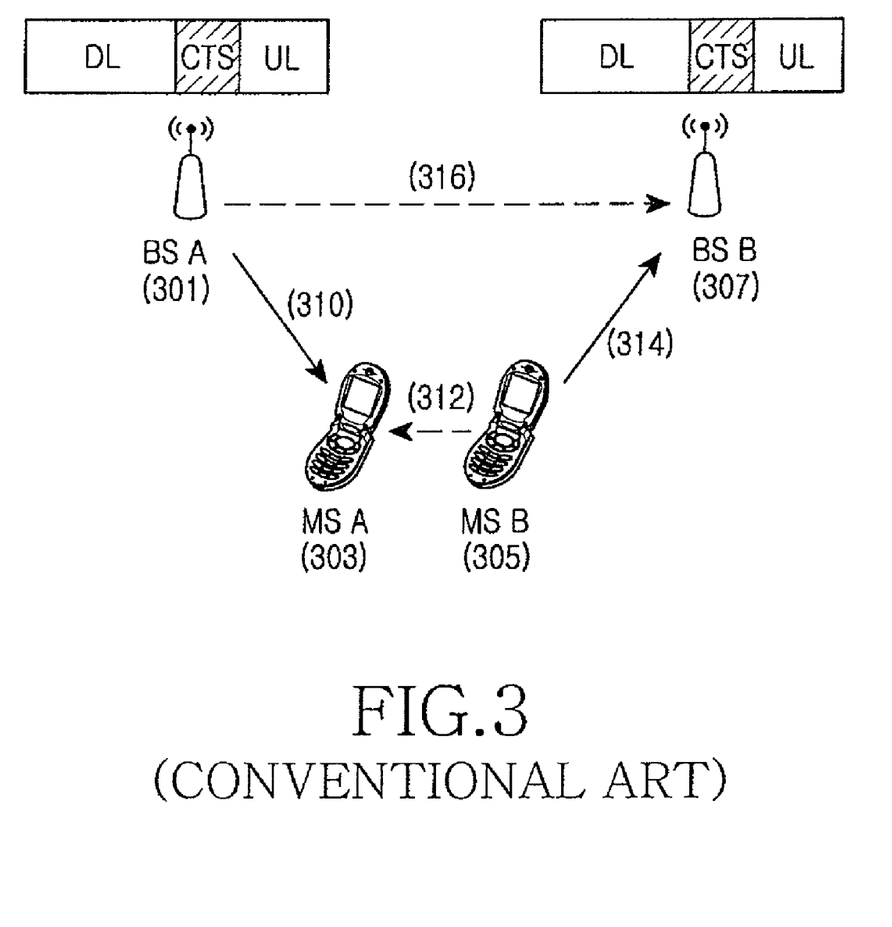
FIG. 3 illustrates interference of a CTS in a conventional flexible TDD system.

FIG. 3 illustrates interference in a CTS in a conventional flexible TDD system.

In the flexible TDD system of FIG. 3, a UL signal of an MS B 305 in the boundary of the neighbor cell acts as interference 312 to a signal 310 transmitted from a BS A 301 to an MS A 303, and a DL signal of the neighbor BS A 301 acts as interference 316 to a signal 314 transmitted from the MS B 305 in the cell boundary to the BS B 307.

As above, it is hard for the BS and the MS to detect the original signal because of the interference in the CTS. More particularly, since the transmit power of the BS is greater than that of the MS and the antenna gain and the channel condition of the BS are much better than those of the MS, the DL signal of the neighbor BS acts as considerable interference to the UL signal.

To address the interference in the CTS, a Time Slot Allocation (TSA) scheme, a power control scheme, a sectored antenna direction adjustment scheme, and an antenna tilting scheme have been suggested. The TSA scheme avoids allocating UL or DL resource to the CTS, or does not allocate the CTS by allocating DL resources from the left to the right in the frames and allocating UL resources from the right to the left in the frames. The power control scheme regulates the DL transmit power of the BS or the UL transmit power of the MS in the CTS. The antenna direction adjustment scheme varies the antenna directions of the neighbor BSs. The antenna tilting scheme regulates the interference between the neighbor BSs by adjusting the tilt angle of the antenna.

However, when the cell load increases and thus considerable interference of the neighbor BS is caused while allocating all UL resources of the CTS, the STA scheme may fail to receive the UL signal in the CTS. While the interference of the neighbor BS is not so great, when the MSs are traveling mainly in the cell boundary, the STA scheme may fail to receive the UL signal. Moreover, since the STA scheme allocates the resources by taking into account the interference effect on the MS, the MS position, and the cell capacity, the complexity of the scheduler is likely to increase. The power control scheme and the antenna direction adjustment scheme are subject to the performance change depending on the MS distribution. The antenna tilting scheme can be performed in the initial cell configuration. When adjusting the tilt angle of the antenna, the cell coverage may decrease.

SUMMARY OF THE INVENTION

An aspect of the present invention is to address at least the above problems and/or disadvantages and to provide at least the advantages described below. Accordingly, an aspect of the present invention is to provide a method and apparatus for removing interference from a UL signal in a TDD system.

Another aspect of the present invention is to provide a method and apparatus for eliminating a DL signal of a neighbor BS which causes interference to a UL signal in a CTS of a flexible TDD system.

In accordance with an aspect of the present invention, a method for communicating with a Mobile Station (MS) and for removing interference of a signal received from the MS at a Base station (BS) in a Time Division Duplex (TDD) system is provided. The method includes determining whether a section for receiving an UpLink (UL) signal from the MS overlaps with sections for sending a DownLink (DL) signal of neighbor BSs in service, the neighbor BSs sending the DL signal to another MS, when the UL signal section overlaps with the DL sections of the neighbor BSs, detecting DL transmit signal information from the neighbor BSs transmitting in the overlapping sections, and removing interference from the UL signal using the detected transmit signal information.

According to another aspect of the present invention, a BS for communicating with an MS and removing interference from a signal received from the MS in a TDD system is provided. The BS includes a signal receiver for receiving a UL signal from the MS and for determining a UL section for receiving the signal, a channel estimator and interference signal detector for determining whether the UL signal section overlaps with DL signal sections of neighbor BSs, and for detecting DL transmit signal information from a neighbor BS which sends a DL signal to another MS in the overlapping section, and an interference remover for removing interference from the UL signal using the detected transmit signal information.

BRIEF DESCRIPTION OF THE DRAWINGS

The above and other aspects, features and advantages of certain exemplary embodiments of the present invention will become more apparent from the following detailed description when taken in conjunction with the accompanying drawings in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The present invention provides a method and apparatus for removing a DownLink (DL) signal of a neighbor Base Station (BS) which causes interference to an UpLink (UL) signal in a Cross Time Slot (CTS) in a flexible Time Division Duplex (TDD) system.

Figure 4:
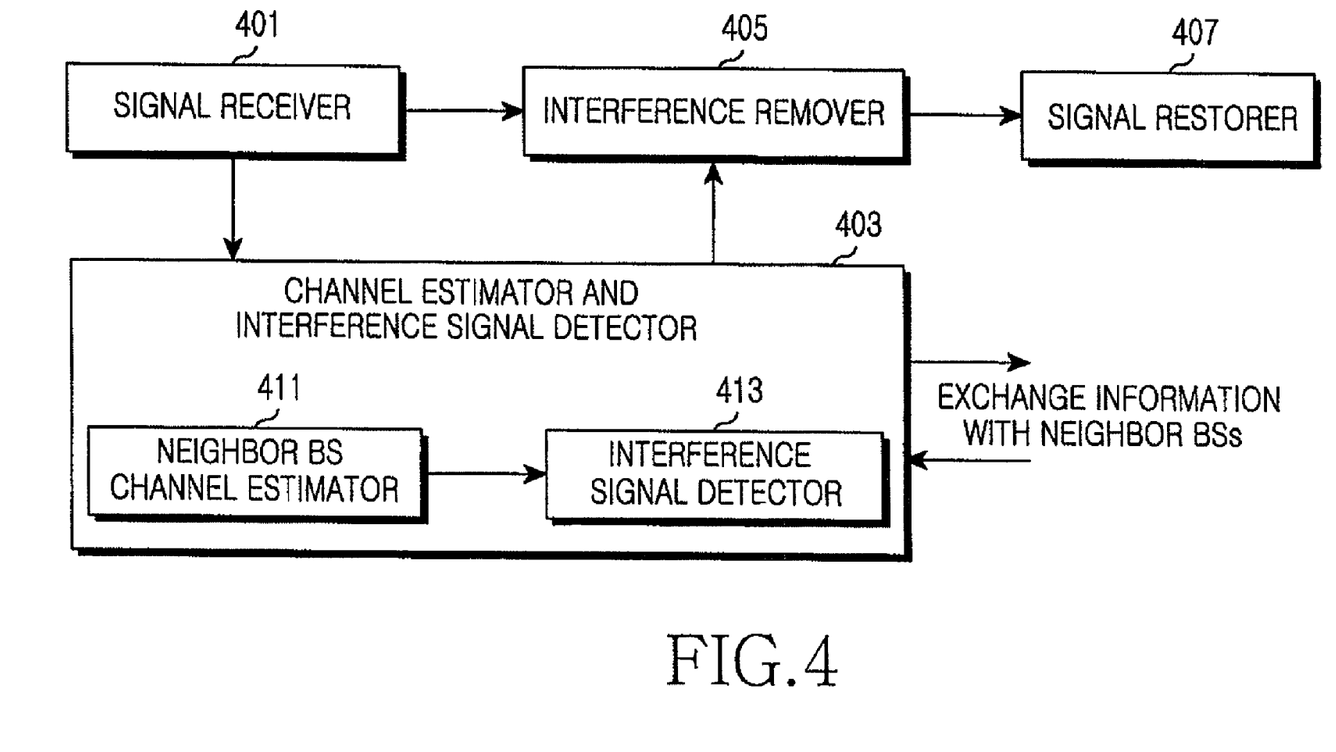
FIG. 4 illustrates a construction of a BS in a TDD system according to an exemplary embodiment of the present invention.

FIG. 4 is a block diagram of a BS in a TDD system according to an exemplary embodiment of the present invention. The BS includes a signal receiver 401, a channel estimator and interference signal detector 403, an interference remover 405, and a signal restorer 407. The channel estimator and interference signal detector 403 includes a neighbor BS channel estimator 411 and an interference signal detector 413. The signal receiver 401 may belong to a Radio Frequency (RF) part, the interference remover 405 may belong to a modem, and the signal restorer 407 may belong to a decoder or a Digital Signal Processor (DSP).

Referring to FIG. 4, the signal receiver 401 receives a UL signal from a Mobile Station (MS) traveling within its cell, outputs the received UL signal to the interference remover 405, confirms a UL section for receiving the signal from the MS, and outputs the confirmed UL section to the channel estimator and interference signal detector 403. The signal receiver 401 estimates channel and noise values of the MS from a preamble of the UL signal and outputs the estimated values to the interference remover 405. The signal receiver 401 can receive a DL signal transmitted from a neighbor BS to an MS in the neighbor BS cell.

The channel estimator and interference signal detector 403 includes the neighbor BS channel estimator 411 and the interference signal detector 413 to detect a DL signal of the neighbor BS which causes the interference to the UL signal by periodically exchanging information with the neighbor BS. The information periodically exchanged with the neighbor BS indicates the UL/DL ratio and the BS preamble or BS postamble. The position of the BS preamble or postamble is designed such that the neighbor BS belonging to the UL can receive it in the CTS. At this time, the frame sync between the BSs is matched in advance.

When the UL section of receiving the signal is fed from the signal receiver 401, the channel estimator and interference signal detector 403 determines whether the UL section overlaps with the DL sections of the neighbor BSs using the UL/DL ratio exchanged with the neighbor BSs, and selects neighbor BSs having the overlapping section. When the UL section does not overlap with the DL section from the neighbor BSs, the channel estimator and interference signal detector 403 informs the interference remover 405 of the UL section not overlapping with the DL section from the neighbor BSs.

When the neighbor BSs are selected, the neighbor BS channel estimator 411 estimates channels with the selected neighbor BSs using the preamble or postamble exchanged with the selected neighbor BSs.

Next, the neighbor BS channel estimator 411 selects a neighbor BS having a channel value greater than a minimum threshold and thus selects the neighbor BSs greatly affecting the UL signal of the BS.

When the neighbor BS is selected, the interference signal detector 413 requests information of the signal transmitted to the MS in the corresponding section, that is, in the DL section overlapping with the UL section of the BS to the selected neighbor BS, and detects an interference signal of the UL signal by receiving the DL transmit signal information from the neighbor BS. When requesting the information of the transmit signal in the corresponding section, the interference signal detector 413 informs the neighbor BS of the corresponding time slot and frame number so that the neighbor BS can send the transmit signal of the corresponding section to the BS. Herein, the BS and the neighbor BS can use a prescribed Modulation and Coding Scheme (MCS) level. If the MCS level is not predefined, the BS needs to receive the MCS level of the transmit signal from the neighbor BS by requesting the transmit signal information.

Next, the interference signal detector 413 outputs a channel value corresponding to the selected neighbor BS and the received DL transmit signal, that is, the interference signal to the interference remover 405.

The interference remover 405 eliminates the interference of the DL signal of the neighbor BS from the UL signal received from the MS using the signal fed from the interference signal detector 413. More specifically, the interference remover 405 receives the UL signal from the signal receiver 401, receives the channel and the DL transmit signal of the neighbor BS causing the interference to the UL section from the interference signal detector 413 of the channel estimator and interference signal detector 403, eliminates the interference of the neighbor BS from the UL signal as expressed in Equation (1), and outputs the interference-free UL signal to the signal restorer 407. When the channel and noise values corresponding to the UL signal are fed from the signal receiver 401, the interference remover 405 outputs the fed channel and noise values to the signal restorer 407. The interference remover 405 bypasses the UL signal received from the signal receiver 401, when informed of the UL section not overlapping with the DL section from the neighbor BSs.

The interference of the neighbor BS is eliminated from the UL signal based on Equation (1).

$$S = Y - \Sigma H_i Z_i \quad (1)$$

In Equation (1), Y denotes the UL signal from the MS, Hi denotes the estimated channel of the neighbor BS, and Zi denotes the DL transmit signal information of the neighbor BS.

The signal restorer 407 receives the interference-free UL signal and the channel and noise values corresponding to the UL signal from the interference remover 405 and detects the original signal transmitted from the MS based on Equation (2).

The transmit signal of the MS is detected from the UL signal from which the interference of the neighbor BS is removed based on Equation (2).

$$S = hs + n \quad (2)$$

In Equation (2), h denotes the channel between the BS and the MS, s denotes the transmit signal of the MS, and n denotes the noise.

Figure 5:
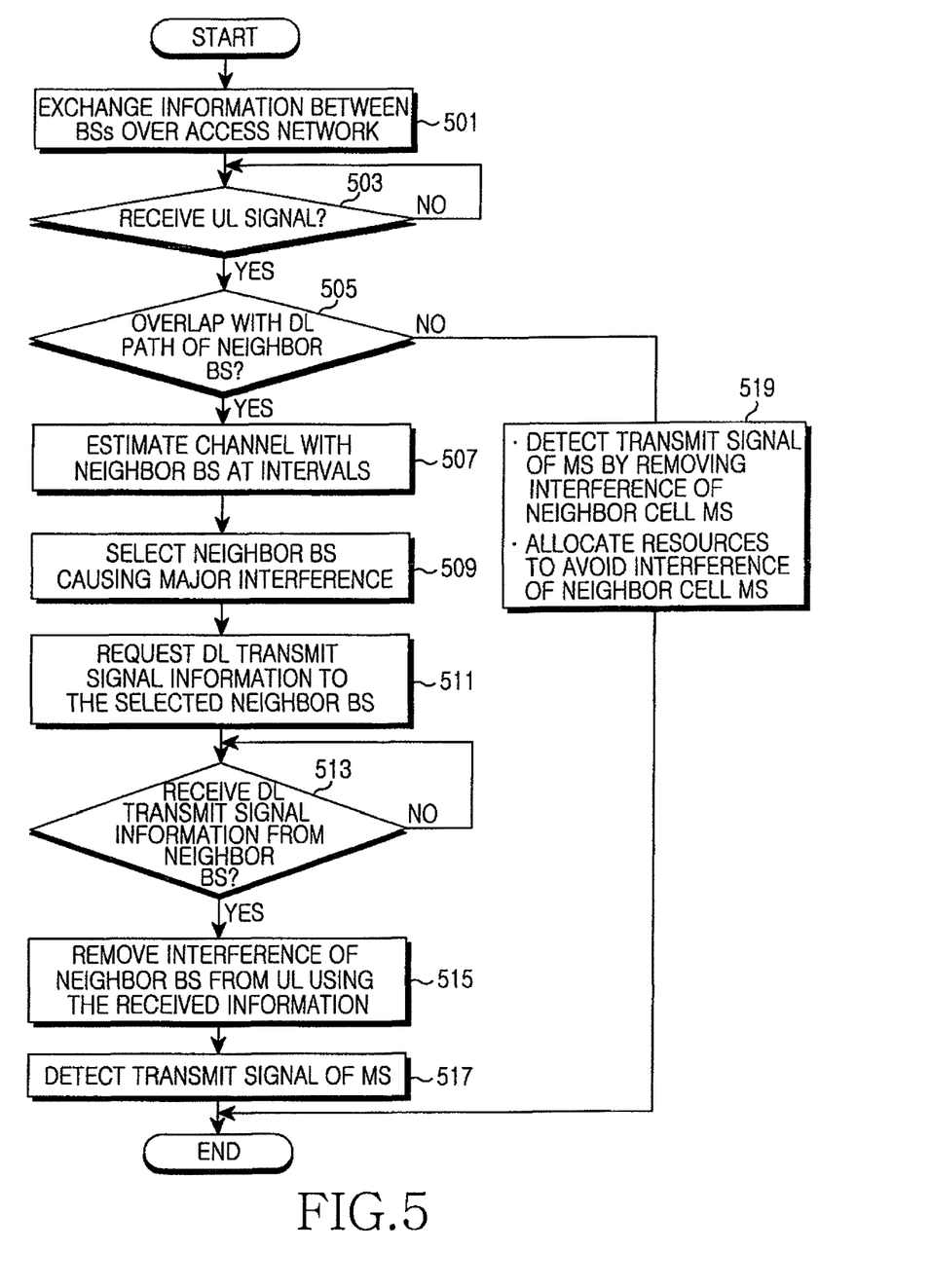
FIG. 5 illustrates a method for removing interference of a neighbor BS in a UL section at a BS of the TDD system according to an exemplary embodiment of the present invention.

FIG. 5 illustrates a method for removing interference of a neighbor BS in a UL section at a BS of the TDD system according to an exemplary embodiment of the present invention.

Referring to FIG. 5, the BS receives a UL/DL ratio and BS preamble or postamble information of the neighbor BSs over an access network, and transmits the received information to neighbor BSs in step 501.

In step 503, the BS determines whether a transmit signal of the MS belonging to its cell is received in the UL section. When receiving the transmit signal of the MS in the UL section, the BS determines whether the UL section of receiving the signal from the MS overlaps with the DL sections of the neighbor BSs in step 505. Whether the UL section of the BS overlaps with the DL sections of the neighbor BSs can be determined using the UL/DL ratio received from the neighbor BSs over the access network in step 501.

When the UL section overlaps with the DL sections of the neighbor BSs, the BS estimates channels by detecting the preamble of neighbor BSs having the overlapping section at certain time intervals in step 507, stores and updates the estimated channels. In step 509, the BS selects neighbor BSs causing the major interference to the UL section by selecting the neighbor BSs having the channel value greater than the preset threshold among the neighbor BSs of the overlapping section.

Next, the BS requests the selected neighbor BSs to send information relating to the signal sent to the MS in the DL section overlapping with the UL signal over the access network in step 511, and examines whether the DL transmit signal information is received from the neighbor BSs in step 513. To request the information of the signal sent to the MS in the corresponding DL section overlapping with the UL signal, the BS transmits the time slot and the frame number to the neighbor BSs. The BS needs to receive the MCS level of the transmit signal from the neighbor BSs by requesting the transmit signal information.

Upon receiving the DL transmit signal information from the neighbor BSs, the BS removes the interference of the neighbor BSs from the UL signal using the received transmit signal information and the channels based on Equation (1) in step 515.

In step 517, the BS detects the original transmit signal of the MS from the interference-free UL signal using the estimated channel and noise values of the MS based on Equation (2). Next, the BS finishes this process.

In contrast, when the UL section does not overlap with the DL sections of the neighbor BSs in step 505, the BS detects the transmit signal of the MS by removing the interference of the MS belonging to the neighbor cell, or allocates the resources not to cause the interference with the MS of the neighbor cell in step 519, similar to the conventional TDD system. Next, the BS finishes this process.

Figure 6:
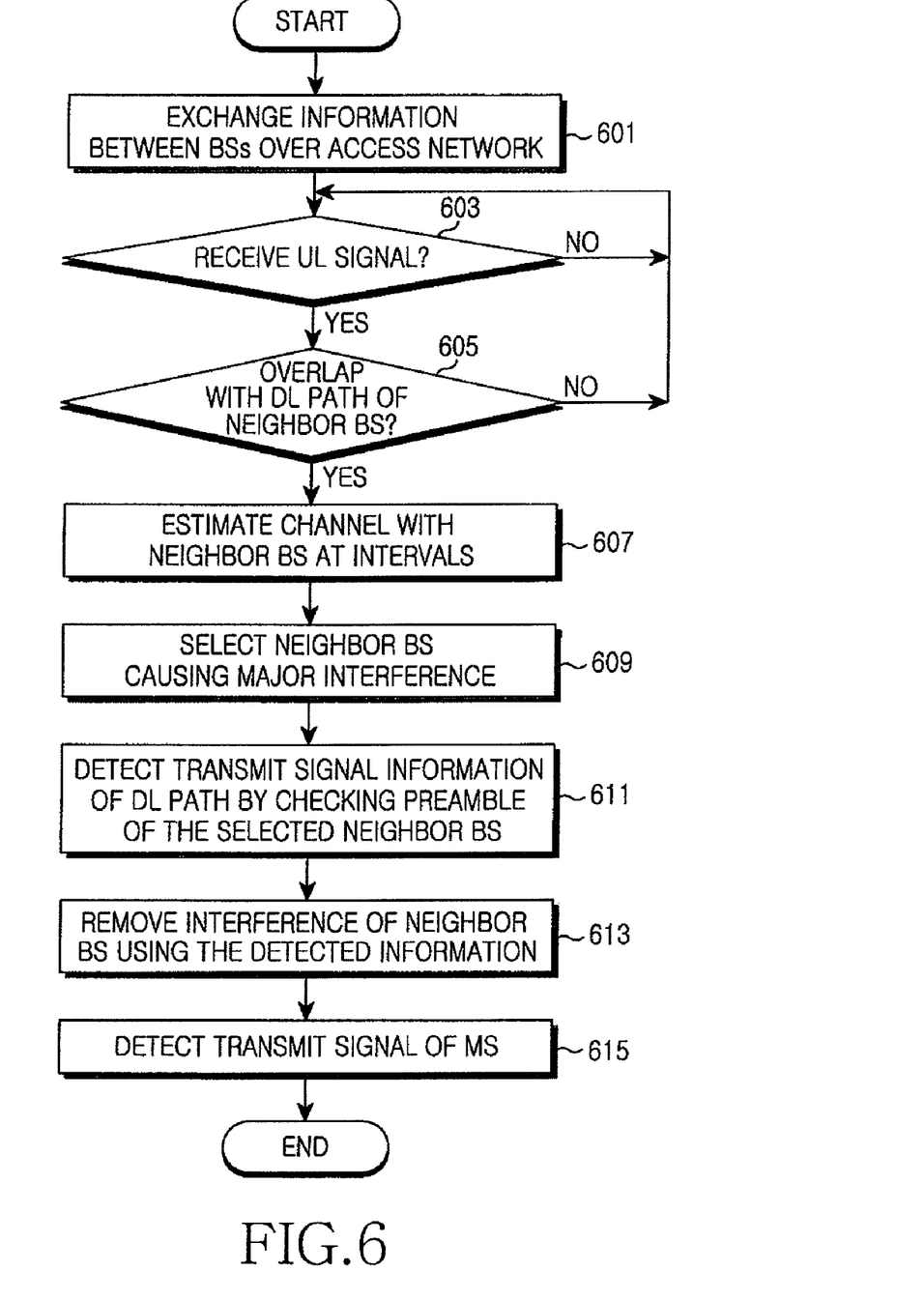
FIG. 6 illustrates a method for removing interference of a neighbor BS in a UL section at a BS of the TDD system according to an exemplary embodiment of the present invention.

FIG. 6 illustrates a method for removing interference of a neighbor BS in a UL section at a BS of the TDD system according to an exemplary embodiment of the present invention.

Referring to FIG. 6, the BS receives a UL/DL ratio and a BS preamble or postamble of neighbor BSs over an access network and sends the information to the neighbor BSs in step 601.

In step 603, the BS determines whether a transmit signal of an MS belonging to its cell is received in the UL section. When receiving the transmit signal of the MS in the UL section, the BS determines whether the UL section for receiving the signal from the MS overlaps with DL sections of the neighbor BSs in step 605. Whether the UL section of the BS overlaps with the DL section of the neighbor BSs can be determined using the UL/DL ratio received from the neighbor BSs over the access network in step 601.

When the UL section does not overlap with the DL section of the neighbor BSs, the BS returns to step 603. When the UL section overlaps with the DL section of the neighbor BSs, the BS estimates channels by detecting a preamble of neighbor BSs having the overlapping section at certain time intervals in step 607, stores and updates the estimated channels. In step 609, the BS selects neighbor BSs causing the major interference to the UL section by selecting the neighbor BSs having the channel value greater than a preset threshold among the neighbor BSs of the overlapping sections.

In step 611, the BS detects DL transmit signals of the neighbor BSs from DL preambles of the selected neighbor BSs, which are received over the access network. When the DL preamble contains information relating to the transmit signal, the BS can detect the transmit signal without having to request the information of the transmit signal to the neighbor BSs.

In step 613, the BS eliminates the interference of the neighbor BSs from the UL signal based on Equation (1) using the detected DL transmit signals and the estimated channels. In step 615, the BS detects the original transmit signal of the MS from the interference-free UL signal using the channel and noise values of the MS based on Equation (2). Next, the BS finishes this process.

The UL/DL sections of the BS may be fixed or variable according to the channel condition. Using the fixed UL/DL sections, the BS may send the information relating to the UL/DL sections to the neighbor BSs only once at the initial phase. Using the variable UL/DL sections based on the channel condition, the BS needs to send the information of the changing sections to the neighbor BSs every time the UL/DL sections change.

While the neighbor BSs causing the major interference are selected by estimating the channels of the neighbor BSs interfering with the UL signal of the BS and only the interference caused by the UL transmit signals of the selected neighbor BSs is eliminated, the DL transmit signal of every BS interfering with the UL signal of the BS can be detected and the interference by the DL signal of every neighbor BS can be removed, rather than selecting specific neighbor BSs.

As set forth above, the interference of the DL transmit signal of the neighbor BS is removed from the UL signal in the CTS in the flexible TDD system. Therefore, the accuracy of detecting the signal from the MS can be raised without having to adopt the complex resource allocation scheme to avoid the interference of the neighbor BSs. Further, since the cell load and the MS distribution in the cell affect less in the CTS, even a system adopting the interference avoid resource allocation scheme can partially employ the present invention only in the CTS.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for communication with a Mobile Station (MS) and removing interference of received signal at a Base Station (BS) in a Time Division Duplex (TDD) system, the method comprising:
   receiving an UpLink (UL) signal from the MS during an UL section, the UL signal including interference;
   detecting whether neighbor BSs send a DownLink (DL) signal in a DL section during the UL section;
   when the UL receive section overlaps with the DL transmit section of the neighbor BSs, detecting the DL transmit signal of the neighbor BSs in the overlapping sections; and
   removing the interference from the UL signal using information of the DL transmit signal.

2. The method of claim 1, wherein, when the BS communicates with the MS in the TDD system, a frame, which is a unit for sending and receiving data, comprises a UL section and a DL section wherein the sections are fixed for each BS.

3. The method of claim 2, wherein the neighbor BSs inform each other of information relating to the UL section and the DL section fixed for each BS at an initial configuration.

4. The method of claim 1, wherein, when the BS communicates with the MS in the TDD system, a frame, which is a minimum unit for sending data, comprises a UL section and a DL section wherein each size of the sections vary according to a channel condition.

5. The method of claim 1, further comprising:
   estimating a channel of the neighbor BSs sending in the overlapping section; and
   eliminating interference of the received UL signal from the MS using the estimated channel.

6. The method of claim 5, wherein the channel estimation of the neighbor BSs uses at least one of a preamble and a postamble periodically exchanged with the neighbor BSs over an access network.

7. The method of claim 5, further comprising:
   selecting neighbor BSs having a channel value greater than a preset threshold according to the result of the channel estimation; and
   detecting DL transmit signal information of the selected neighbor BSs.

8. The method of claim 1, further comprising:
   detecting an original transmit signal of the MS from the interference-free signal by estimating channel and noise values with the MS corresponding to the UL signal.

9. The method of claim 1, wherein the DL transmit signal information from the neighbor BS comprises:
   the DL transmit signal which the neighbor BSs send to another MS other than the MS, and
   the used Modulation and Coding Scheme (MCS) level at the neighbor BSs.

10. The method of claim 9, wherein the signal for requesting the signal information comprises at least one of a time slot and a frame number indicative of the corresponding DL section overlapping with the UL signal section.

11. A Base Station (BS) for communicating with a Mobile Station (MS) and removing interference from a signal received from the MS in a Time Division Duplex (TDD) system, comprising:
   a signal receiver for receiving an UpLink (UL) signal from the MS in a UL section, the UL signal including interference;
   a channel estimator and interference signal detector for determining whether the UL signal section overlaps with DownLink (DL) transmit signal sections of neighbor BSs, and for detecting the DL transmit signal of neighbor BSs which send a DL signal to another MS in the overlapping section; and
   an interference remover for removing the interference from the UL signal using information of the detected transmit signal.

12. The BS of claim 11, wherein, when the BS communicates with the MS in the TDD system, a frame, which is a unit for sending and receiving data, comprises a UL section and a DL section wherein the sections are fixed for each BS.

13. The BS of claim 12, wherein the neighbor BSs inform each other of information relating to the UL section and the DL section fixed for each BS at an initial configuration.

14. The BS of claim 11, wherein, when the BS communicates with the MS in the TDD system, a frame, which is a minimum unit for sending data, comprises a UL section and a DL section wherein a size of the sections vary according to a channel condition.

15. The BS of claim 11, wherein the channel estimator and interference signal detector estimates a channel of the neighbor BSs sending in the overlapping section, and
   the interference remover eliminates interference from the UL signal using the estimated channel.

16. The BS of claim 15, wherein the channel estimation of the neighbor BSs uses at least one of a preamble and a postamble periodically exchanged with neighbor BSs over an access network.

17. The BS of claim 11, wherein the signal receiver calculates channel and noise values with the MS which sends the UL signal, and further comprising:
   a signal restorer for restoring an original transmit signal of the MS from the interference-free signal using the calculated channel and noise values.

18. The BS of claim 11, wherein the DL signal is detected by requesting the neighbor BSs to send information of a signal sent to the MS in the overlapping section.

19. The BS of claim 18, wherein the signal for requesting to send the information of the DL transmit signal contains at least one of a time slot and a frame number indicative of the overlapping DL section.

20. The BS of claim 11, wherein the channel estimator and interference signal detector estimates channels of the neighbor BSs sending the signal in the overlapping section, selects neighbor BSs having a channel value greater than a preset threshold according to the result of the channel estimation, and detects DL transmit signal information of the selected neighbor BSs.

21. The BS of claim 11, wherein the information of DL transmit signal contains a Modulation and Coding Scheme (MCS) using at the neighbor BSs.

* * * * *